Figure 1:
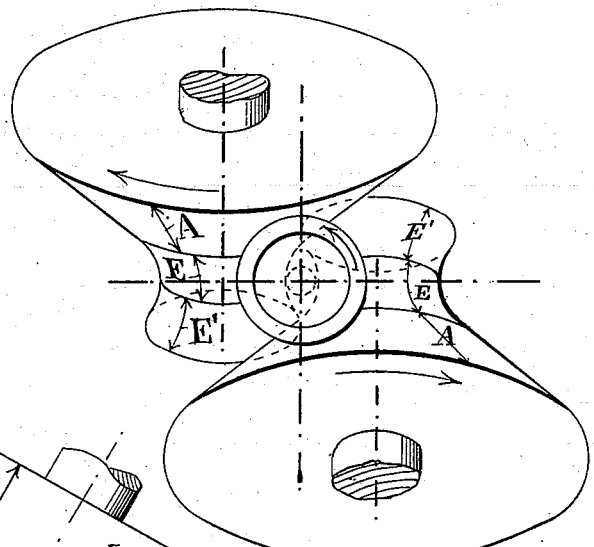

No. 651,790. Patented June 12, 1900.
J. BECKER.
MACHINE FOR ROLLING SOLID OR PIERCED BLANKS FOR FORMING TUBES OR TUBULAR BLANKS.
(Application filed Apr. 2, 1900.)
(No Model.) 6 Sheets—Sheet 1.

Witnesses
Marie Becker.
Edgar Jordan

Inventor
Joseph Becker

No. 651,790. Patented June 12, 1900.
J. BECKER.
MACHINE FOR ROLLING SOLID OR PIERCED BLANKS FOR FORMING TUBES OR TUBULAR BLANKS.
(Application filed Apr. 2, 1900.)
(No Model.) 6 Sheets—Sheet 2.

Witnesses
Marie Becker.
Edgar Jordan

Inventor
Joseph Becker

No. 651,790. Patented June 12, 1900.
J. BECKER.
MACHINE FOR ROLLING SOLID OR PIERCED BLANKS FOR FORMING TUBES OR TUBULAR BLANKS.
(Application filed Apr. 2, 1900.)
(No Model.) 6 Sheets—Sheet 3.
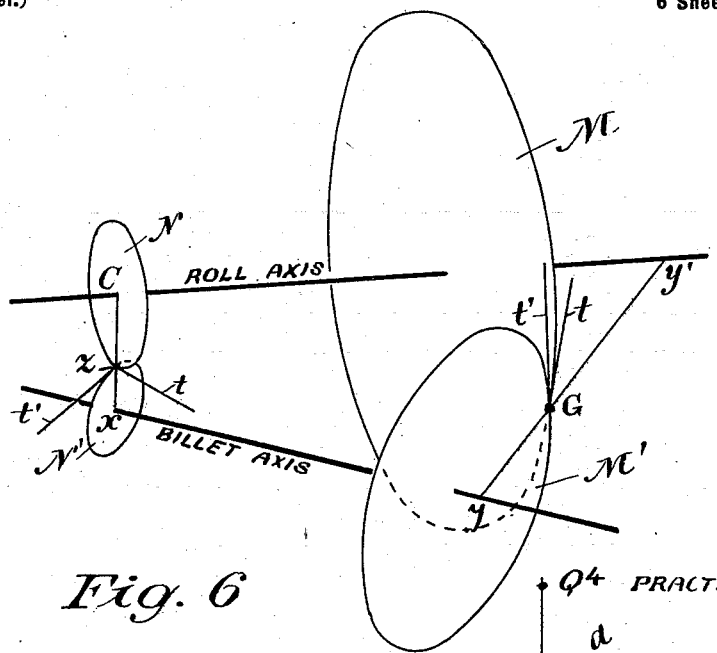
Fig. 6
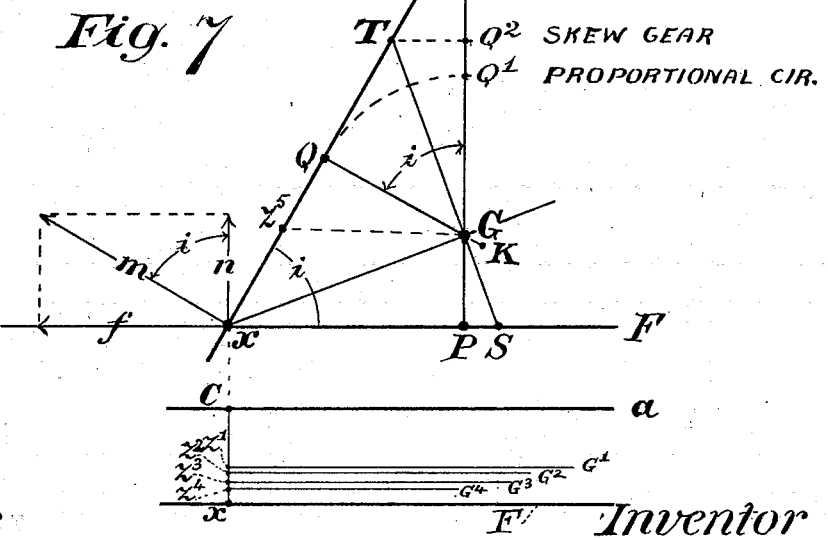
Fig. 7
Fig. 8
Witnesses
Marie Becker
Edgar Jordan
Inventor
Joseph Becker No. 651,790. Patented June 12, 1900.
J. BECKER.
MACHINE FOR ROLLING SOLID OR PIERCED BLANKS FOR FORMING TUBES OR TUBULAR BLANKS.
(Application filed Apr. 2, 1900.)
(No Model.) 6 Sheets—Sheet 4.

Witnesses
Marie Becker.
Edgar Jordan

Inventor
Joseph Becker

No. 651,790. Patented June 12, 1900.
J. BECKER.
MACHINE FOR ROLLING SOLID OR PIERCED BLANKS FOR FORMING TUBES OR TUBULAR BLANKS.
(Application filed Apr. 2, 1900.)
(No Model.) 6 Sheets—Sheet 5.

Witnesses
Marie Becker.
Edgar Jordan

Inventor
Joseph Becker

No. 651,790. Patented June 12, 1900.
J. BECKER.
MACHINE FOR ROLLING SOLID OR PIERCED BLANKS FOR FORMING TUBES OR TUBULAR BLANKS.
(Application filed Apr. 2, 1900.)
(No Model.) 6 Sheets—Sheet 6.

Witnesses
Marie Becker.
Edgar Jordan

Inventor
Joseph Becker

UNITED STATES PATENT OFFICE.

JOSEPH BECKER, OF WASHINGTON, DISTRICT OF COLUMBIA, ASSIGNOR TO JOHN E. SEARLES, OF NEW YORK, N. Y., AND WILLIAM C. LOVERING, OF TAUNTON, MASSACHUSETTS.

MACHINE FOR ROLLING SOLID OR PIERCED BLANKS FOR FORMING TUBES OR TUBULAR BLANKS.

SPECIFICATION forming part of Letters Patent No. 651,790, dated June 12, 1900.

Application filed April 2, 1900. Serial No. 11,248. (No model.)

*To all whom it may concern:*

Be it known that I, JOSEPH BECKER, a citizen of the United States, residing at Washington, District of Columbia, have invented a certain new and useful Improvement in Machines for Rolling Solid or Pierced Blanks to Form Tubes or Tubular Blanks, of which the following is a specification.

My invention is a specific improvement in the type of rolling-machine described in Patent No. 361,963, of April 26, 1887, to Mannesmann for the manufacture of seamless tubes; and its object is to so modify Mannesmann's rolls that they shall, while doing about the same work, have little or no twisting action on the metal. In said patent the rolls are of a special so-called "hemispheroidal" shape and are set to form between them a continuous pass which first contracts and then diverges and in which the metal is first reduced and then expanded. In the expanding part of the pass the metal is acted upon by the straight taper or "conical" zone, which is intended to be non-twisting, and in the reducing part of the pass it is acted on by the "spherical" zone, which has a twisting action so violent that it is impossible to use in this machine any but the very highest grade of metal. Now my objects are, first, to modify the spherical zones so they shall have very little more twisting action than the conical zones, and, secondly, to modify both the expanding and the reducing zones so all elementary zones of the rolls shall have exactly the same rotative effect. I attain these objects by changing such spherical zone to a concave extension converging or contracting to the point of closest approach of the roll-axes and expanding again beyond that point. Such concave extension may be symmetrical with respect to the point of closest approach of the axes and may be the central zone of a properly-selected hyperboloid, and the expanding zone, of which it is an extension, may be a continuation of the same hyperboloid, and such hyperboloid may be proportioned and set, as I shall show, to give exact rolling without twist. The fundamental principle of such exact equal rolling, which is that the smaller roll-circles should be greater in proportion than the larger ones, is, though secondary in this case, of such general application as to constitute a very important, if not the main, part of my present invention.

I will now describe my invention in connection with the accompanying drawings, in which—

Figure 2:
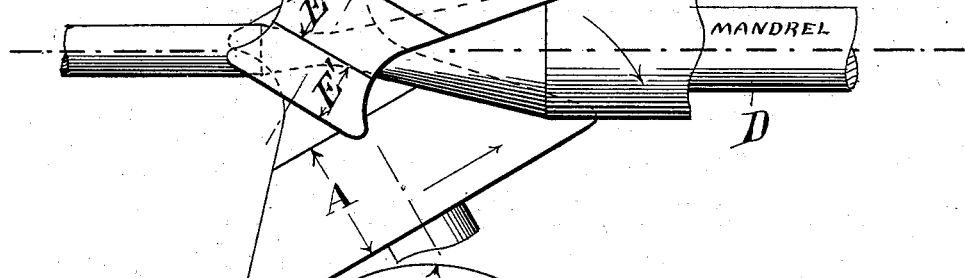
Figure 3:
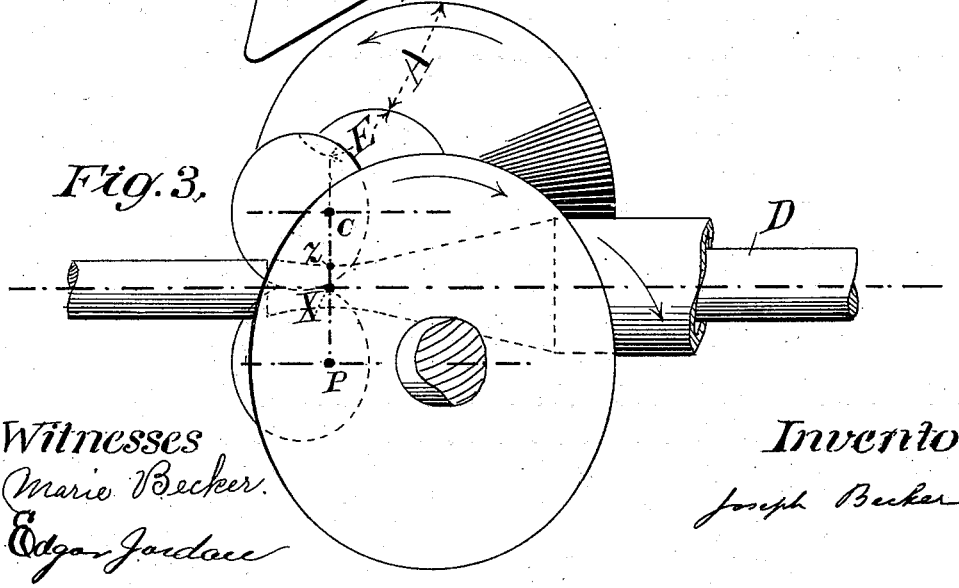
Figure 4:
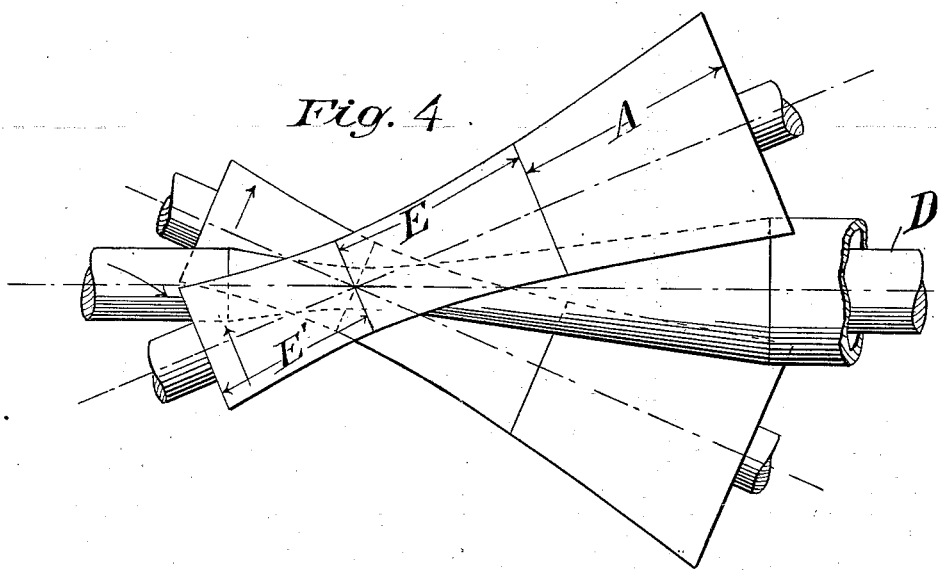
Figure 5:
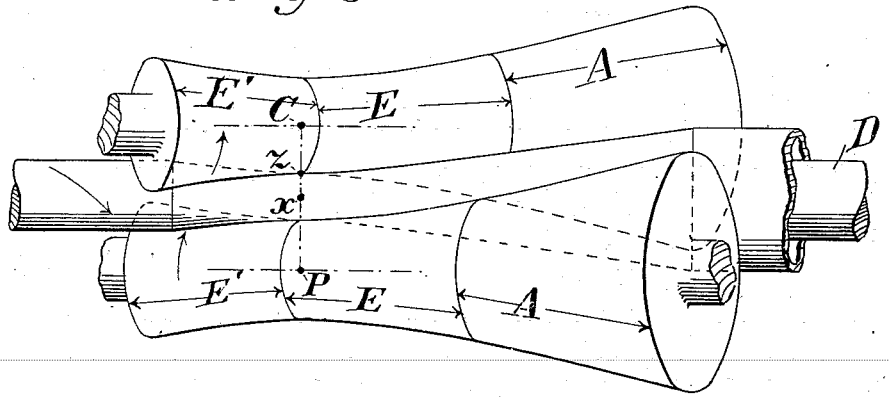
Figure 10:
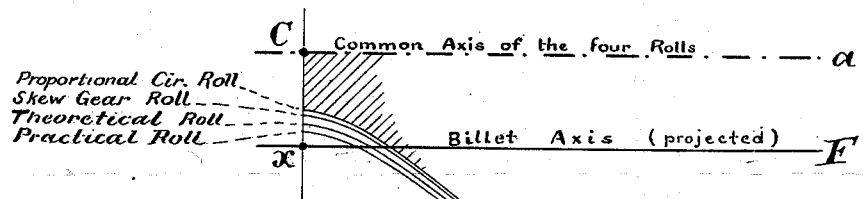
Figure 9:
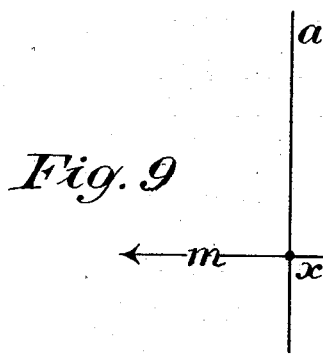
Figure 11:
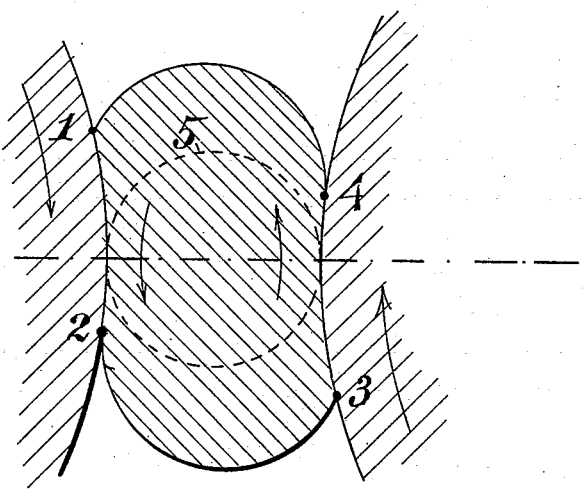

Figures 1, 2, and 3 are respectively rear, side, and plan views of a form of my invention wherein the straight-taper zones of the rolls approximate those of Mannesmann's hemispheroidal mill, while Figs. 4 and 5 are side and plan views wherein the proportions of the Stiefel patents, Nos. 618,917 and 605,027, are approximated. Fig. 6 is a perspective diagram showing the obliquity of the driving action of the roll-circles on the corresponding driven circles of the billet, the axes being for clearness shown horizontal. Figs. 7 and 8 are an elevation and a plan of a roll-axis and a billet-axis and of geometrical constructions to be made in determining the shape and proportions of different rolls for axes of given set. Fig. 9 illustrates a point in the special case of axes at right angles. Fig. 10 shows the profiles of the four different kinds of rolls referred to in this specification. Fig. 11 is a diagram illustrating roughly the flattening of a billet; and Figs. 12, 13, 14, and 15 are diagrams showing the exact relation between my roll and the Mannesmann's hemispheroidal roll, which produces the same billet.

In my Figs. 1, 2, and 3 the expanding zone A, which may be a straight taper, corresponds to the non-twisting expanding zone of the Mannesmann patent referred to, while the concave extension comprising the zones E and E' is a substitute for the spheroidal twisting extension. The rolls are rotated in the direction of the arrows to feed toward their larger ends, though by rotation in the opposite direction they might be made to feed toward their smaller ends to reduce, as is well known in the art. Considering the rolls as rotated in the direction shown, it will be seen that the billet is first engaged by the zones E' E' of the extension, which, like the pass between them, converge toward the line CP, Fig. 3, passing perpendicularly through the points of closest approach of the roll-axes. The adjacent zones EE diverge similarly and beyond the common perpendicular CP to the final expanding zones AA. The expanding zones AA in my machine may be substantially the same as the expanding zones in said patent to Mannesmann, in which the rolls are practically non-twisting in the expanding part of the pass and have most of their twisting action in the reducing part, where the circles of the reducing or hemispheroidal zone go, decreasing in size as those of the billet go increasing, which is just the reverse of what should be to secure non-twist rolling. In my device the larger circles of the billet are all engaged by the larger circles of the roll and the smallest intermediate circle of the billet by an intermediate circle of the roll which is the smallest roll-circle. The rolls have the same general shape as the billet, and when the roll and billet are in engagement the space between their axes varies in the same direction as the roll and billet circles or radii—that is, such space first goes decreasing where it corresponds to the reducing zone and then goes increasing where it corresponds to the expanding zones. The smallest circle of the billet and the smallest circle of the roll lie at or near the point of closest approach of the roll-axes. This point of closest approach is found in my Figs. 2 and 3 (which correspond to Mannesmann's Figs. 1 and 5) at the apparent intersection of the axes. By reference to the Mannesmann patent it will be seen that the whole of his pass lies to one side of this point of closest approach and that the reducing part of his pass is made to go increasing in a region where the space between the axes goes decreasing. Thus for equal rotation at the entrance of his pass the billet ought to be smaller than it is now at the smallest circle and the roll ought to be larger. The increase in the billet acts to retard, and the decrease in the roll also acts to retard, so the two effects when added act to hold back the metal and cause a violent twist.

My concave extension may extend nearly to the line CP, or it may extend beyond the same a considerable distance, and where a considerable reduction of the billet is desired the extension may be made as long as necessary to give a pass entrance of any desired size. The form shown in Figs. 1, 2, and 3 is intended to embody an extreme case, where the zone E' of one roll cannot be extended much farther without interfering with the zone A of the mating roll. When the proportions are as shown in Figs. 4 and 5, there is no theoretical limit to the extension of the zones in either direction. When the roll of Figs. 4 and 5 extends symmetrically and equally either side of line CP, the machine becomes the concaved equivalent of Mannesmann's "barrel-shaped" rolls described in Patent No. 361,959, of April 27, 1887.

It is seen that while my rolls are concave and conform in general outline to the billet acted upon Mannesmann's are convex and in his barrel-shaped rolls exactly the reverse of the billet in shape. This radical departure from the Mannesmann practice is the gist of my present invention and insures so great a reduction in the amount of twist that my rolls may vary considerably in proportion and arrangement without materially defeating the object in view. Where, however, exact equal rotation is desired the rolls must of course have a certain proportion and a certain relative arrangement. It would naturally be supposed that dimensions and an arrangement which would make the contacting circles of roll and billet proportional would answer, and so it would if all the roll-circles could be made to act on their respective billet-circles in line with the contact elements of said billet-circles or else at a same inclination therewith. Either of these conditions is geometrically impossible, because of the skewed relation of the roll to the billet, owing to which the smallest roll-circle acts at a decided angle across the contact element of its corresponding billet-circle, while the largest roll-circle acts almost in line with the contact element of its corresponding billet-circle. To make this difference clear, I have made a diagram, Fig. 6, in which the circles M and N are circles of a roll, and M' and N' the corresponding circles of a billet. At the point of contact the circles M and N move along the tangents $tt$, which make, with the contacting elements of the billet-circle, angles $tGt'$ and $tZt'$, which determine the obliquity of the action, clearly seen to be rather small at G and very great at Z. Thus where roll and billet are large in diameter their circular elements at the point of contact, as apparent in Figs. 1, 2, 4, and 5, are nearly coincident; but as we approach the line CP the contacting circles are seen to overlap and cross more and more until CP is reached, where the roll-circle acts across the billet-circle at an angle equal to the angle $axF$ between the roll-axis and the billet-axis. This variability in obliquity is made still clearer by considering how much the different roll-circles must be slewed around to bring them from their actual position to one in which their contact elements would coincide with those of the billet-circles. For this purpose a proper axis is the common normal of roll and billet through the point of contact. This common normal is perpendicular to the contact element of the billet-circle and perpendicular to that of the roll-circle, and therefore when produced must meet the two axes. In Fig. 6 the normal through G is $yy'$ and that through $z$ is $Cx$. Now if the roll-circle M, for instance, and its axis as a whole be revolved about the normal $yy'$ to close the angle $tGt'$ the roll-axis will, when said angle is closed, intersect the billet-axis and the two circles M and M' will be in the relation of bevel-gears. Closing the angle $tGt'$ is therefore tantamount to bringing the roll-axis and the billet-axis together about the common normal $yy'$ as a hinge. If the hinge is distant from CP, the angular motion necessary to do this is small, and if the hinge is close it is great. At the crossing-point of the axes the common normal CP is also perpendicular to the axes, which therefore cannot be made to meet except at infinity, when they are parallel. The obliquity of the smallest roll-circle to its billet-circle is therefore equal to the skew angle between the axes, which is otherwise obvious enough. Beyond the line $Cx$ the relations are symmetric with regard to $Cx$ of what they are on the side just considered.

In the case illustrated in Figs. 1, 2, and 3 the cross action of the smallest circles is at almost three-quarters of a right angle, so the rotary effect of the smallest roll-circle on the smallest billet-circle is less than one-half of what it would be if not reduced by obliquity, whereas the largest circle acts almost with full effect. It is clear, therefore, that if the contacting circles are made proportional the smallest roll-circles will, for axes set as in Figs. 1, 2, and 3, be only one-half as efficient as the largest circle. In the proportions of Figs. 4 and 5 the difference is not so great, but exists nevertheless, and must in this, as in all other cases, be compensated for by suitably increasing the rotative effect at the crossing-point or point of closest approach. This can be done in a variety of ways, of which the most obvious is to increase the radius of the smallest roll-circle and correspondingly decrease the radius of the smallest billet-circle. To determine how much this increase should be, I have first determined the loss of rolling efficiency due to the obliquity of the action. In the diagram Fig. 7 of the roll and billet axes at the crossing-point the point of contact must move perpendicularly to the roll-axis, as indicated by arrow $m$. The motion $m$ resolves into a forward motion $f$, representing draw or feed, and a lateral motion $n$, which being perpendicular to the billet-axis represents pure rotation. The rolling effect is therefore smaller than indicated by the absolute velocity in the ratio of $n$ to $m$. The ratio of the smallest roll-circle to the billet-circle, as determined by the rule of proportional circles mentioned, should therefore be increased in the proportion of $m$ to $n$. Correction should be applied to all the circles; but at points distant from the region CP of closest approach the roll-circles, acting almost tangentially, need little correction and at a comparatively-great distance none at all. I find that the corrected shape of roll may be fairly well determined by a straight line joining the point of contact of larger roll and billet circles, as determined by the proportional rule to the point of contact of the smallest roll and billet circles corrected as above. Such a line revolved about the roll-axis in fixed relation thereto will generate the roll and being a straight line will generate a hyperboloid roll similar to those referred to in the theory of the pitch-surfaces of skew-bevel gears.

It will make matters clearer to explain just what relation my rolls do bear to the hyperboloid pitch-surfaces of corresponding skew-bevel gears. In the elevation and plan of the axes, Figs. 7 and 8, let $a$ be, as before, the roll-axis, and F the billet-axis. According to the theory of skew-bevel gears to be found in any treatise on gears the line of contact G in the elevation is first drawn as it would be to represent the line of contact of plain bevel-gears whose axes intersect when produced—that is, the line $Gx$ is drawn so the perpendiculars GP and GQ shall be inversely proportional to the ratio of revolutions. In the plan view the line of contact projects as a line $G^2 Z^2$ parallel to the projections of the axes and dividing the distance between them in the ratio of the tangents of angles $Gxa$ and $GxF$ in the elevation, which is the same as the ratio of GT to GS in the line ST, Fig. 7, perpendicular to the line $Gx$. Now the generatrix of my theoretical roll is a line having the same elevation $Gx$, Fig. 7, as above, but closer to $xF$ in the plan where it is represented by $G^3 Z^3$, dividing the distance $Cx$ in the ratio of line $GQ^3$ to line GP, which ratio is as much greater than the ratio of GQ to GP as $m$ is greater than $n$. The ratio of GQ to GP is of course the constant ratio of the "proportional-circle" rule. In the proportions shown the hyperboloid, set according to the rules of skew-gearing, has substantially the same rotative effect at a relatively-great distance from the crossing-point of the axes as my roll; but it has only three-fifths as much rotating effect at said crossing-point or point of closest approach—that is, if my theoretical roll could be exactly non-twisting the corresponding skew-gear hyperboloid would put in a twist of one hundred and forty-four degrees at every revolution of the unreduced part of the blank or two complete twists at every fifth revolution of said part of the blank. My theoretical rolls are the equivalent of hyperboloid rolls in the same relation, but swollen at the center, or unmodified at the center, but reduced in the larger circles, or they may be considered as pure hyperboloids not changed in shape, but set in a certain relation different from that required by the theory of skew-gearing—closer to the billet-axis in plan or angularly farther apart (closer in special cases) in elevation. The four modes are different, but equivalent in effect. I need not dwell on this point, but will conclude with a clear, full, and specific instruction of the rule to be followed in plotting and setting my theoretical roll. Draw elevation and plan, Figs. 7 and 8, of roll and billet axes. In Fig. 7 draw line $Gx$ as for plain bevel-gears—that is, so as to make perpendiculars GP and GQ inversely proportional to the revolutions produce PG to $Q^3$. In the elevation, Fig. 8, draw line $G^3z^3$ parallel to $Ca$ and dividing $Cx$ in the proportion of $GP$ to $GQ^3$. The theoretical roll as given above requires an additional correction in practice; but before considering the practical roll it may be well to dispose of an apparent inconsistency between my theory and that of the hyperboloid roll of skew-bevel gears. It might be supposed that skew-bevel gears, being rigid and of course non-twisting, ought to contain the principles of non-twist rolling. The answer to this is that a roll and its billet do not act in the same way as a skew-bevel gear and its pinion. In the roll and billet those points of the billet which are in contact with the roll are intended to move with the roll, so as to be not only revolved, but carried forward (to feed) and forced in radially, (to reduce when the roll turns to reduce.) In the skew-gear and pinion we have the same motions of the driver element; but the driven element simply revolves. The teeth lying in skewed relation to the axes convert the feed component by a cam action into a rotary component. The action of a driving-tooth on a driven tooth is really composed of a direct push similar to that present in any spur or plain bevel-gear and of a further additional push due to a sort of cam action between the teeth similar to that present in a worm-gear in which the driven elements move at right angles to the driving element. Skew-gears are really a cross between the worm and the plain bevel-gears, partaking most of the worm at the crossing-point and most of the plain bevel-gear at a distance from said crossing. Such cam action therefore is different at different points along a tooth. Thus at a distance from the crossing-point of the axes the direct push predominates, and at the crossing-point the worm or cam action reaches its highest proportion and actually predominates if the axes are at a considerable angle. Now, as a skew-gear is non-twisting with a variable rotary cam action along its teeth, it is clear that suppression of this action must leave the combination a twisting one to be corrected, like the proportional-circle case first referred to, by increasing the rotative effect of the smaller circles. This cam action of hyperboloid gear-teeth may be clearly brought out by considering the case in which the axes are at right angles. (See Fig. 9.) In this case whatever be the ratio of revolutions the driving-gear has absolutely no direct rotary effect at the crossing-point of the axes. The component $n$ of $m$ becomes *nil*. All of the rotation at this point is due to pure cam action of the teeth, removal of which would stop all rotary action and leave nothing but feed.

In the diagram Fig. 7 I have clearly shown the relation of the proportional rule, skew-gear rule, and my theoretical rule. The axes being supposed in fixed relation, the smallest circles of the rolls should be proportional to $PG$ and $GQ'$ according to the proportional rule, proportional to $PG$ and $GQ^2$ according to the skew-gear rule, and finally proportional to $PG$ and $GQ^3$ according to my theoretical rule.

Having fully explained my theoretical roll, I shall now consider the practical roll.

Up to this point the billet has been considered as perfectly circular in cross-section; but in practice it is and must be flattened and distorted, as indicated in exaggerated manner by Fig. 11. The outline is seen to be concave from 1 to 2 and from 3 to 4, where the billet is touched by the rolls, and convex from 2 to 3 and from 4 to 1, where it is free to expand. It is clear in the figure that the real billet has a longer periphery than the theoretical billet 5. The greatest amount of flattening is of course in the narrowest part of the pass, and that is in my special device at the crossing-point of the axes. My theoretical roll, therefore, by flattening of the billet loses in rotative effect as the crossing-point is neared and loses most at said point. This is exactly the same defect that I have pointed out above in the rolls constructed according to the "proportional rule" and the "skew-gear" rule. The practical roll, therefore, bears to my theoretical roll the same relation as my theoretical roll bears, say, to the skew-gear roll, and may be got from my theoretical roll by applying to it the same kind of correction that I have indicated for skew-gear rolls—that is, having first determined the theoretical roll to make it practical it should be swollen at the crossing-point or reduced away from it, or, if left unchanged in shape, it should be changed in relation to the billet-axis by setting the axes closer in plan or else angularly farther apart in elevation. My practical roll would be determined by a line $Gx$, projected in elevation as $Gx$ and in plan as $G^4Z^4$, where it divides $Cx$ in the proportion of $PG$ to $GQ^4$, $Q^4$ being above $Q^3$ as much as found necessary by experiment for the particular metal used and the special temperature at which it is to be worked.

I have found it convenient in comparing different rolls to represent them all by the closest hyperboloids. Assuming the smallest and the largest circle of a roll determined, it is always possible to construct a hyperboloid having exactly the same smallest circle and the same largest circles and differing very little from the true roll at intermediate points, and therefore proportional-circle rolls hyperboloids "swollen" at the middle or hyperloids "reduced" at the ends may all be considered as pure hyperboloids differing only in shape and may all be determined by their straight-line generatrix, which would be the line of contact if the hyperboloids were set according to the rules of skew-gearing to mesh with an interposed hyperboloid billet. To further facilitate comparison, it is best to consider the rolls as all having the same diameter at a relatively-great distance from the crossing-point. When these suppositions are all taken into account, the line $Gx$ in the elevation, Fig. 7, may represent the common elevation of all the different generating-lines and the lines $G'Z'$, $G^2Z^2$, $G^3Z^3$, $G^4Z^4$ their respective plans. The rotational effect, while substantially the same for all the rolls at a distance from the crossing-point, is at said point very different, being at $Z'Z^2Z^3Z^4$ proportional to the lines $G'Q'$, $G^2Q^2$, $G^3Q^3$, $G^4Q^4$, or, expressed in numbers about as 5, 6, 10, and 13. Hence in thirteen revolutions of the unreduced part of the blank the number of twists in the billet would be: for the proportional circle-roll, $13-5=8$; for the skew-gear roll, $13-6=7$; for the theoretical roll, $13-10=3$; for the practical roll, $13-13=0$.

In certain cases the error of my "theoretical roll" almost vanishes; but the error of the other rolls never can.

In order that the parallelism of the generating-lines in the plan view be not mistaken as adding an equal increment to all the radii, I have added the diagram of profiles, Fig. 10. The addition is seen to be gradual and greatest at the smallest diameter and almost *nil* for the large circles where a very large addition would be necessary to make any perceptible difference in the rotary effect. Any one of the terms "proportional-circle roll," "skew-gear roll," "theoretical roll," and "practical roll" is not limited to any certain shape or proportions of roll, except in connection with a certain relation of axes. A same roll may by changing the relation of its axis to the billet-axis become any one of the four. It is only when the axes are supposed fixed in relation, as in the comparison above, that the different rules lead to rolls of different shape, as in Fig. 10. The difference between the four kinds of rolls is most certainly defined and made clear not as above by their action on a real billet of irregular periphery, but by their action on a body of revolution—that is, on an ideal billet whose section is perfectly circular. My theoretical roll then becomes exactly non-twisting and the other rolls twisting; but the twist of the practical roll on its ideal billet will be in a direction opposite to the twist put by the other two rolls on their respective ideal billets—that is to say, that for axes in a given relation and for a given rate of revolution of the large billet-circles the smallest billet-circle of the theoretical roll would revolve at the same rate, that of the practical roll faster and those of the other two rolls slower, or in figures, taking the axes as in Figs. 7 and 8 and the rolls as in Fig. 10, and supposing the theoretical roll to cause all sections of its ideal billet to make ten revolutions in a given time, the larger circles of the other ideal billets will also make ten revolutions in the same time; but the smallest circle of the practical roll billet will make thirteen revolutions in the same time, while the smallest circle of the skew-gear billet and that of the proportional-circle billet will make only six and five, respectively. Wherever I have spoken of the number of revolutions of the ideal billet, it should be understood that the numbers given represent rates and not actual revolutions—that is, they are the revolutions the ideal billet would make if it could preserve its circular shape. The ideal circular billet is an absolute impossibility, at least in the reducing part of the pass, for even on the supposition that there is no actual spreading action under pressure a billet made perfectly circular in cross-section would completely lose such circular shape after revolving through only half a turn, because the reducing action thereon cannot take place anywhere except where the billet is in contact with the rolls, and any part of the billet about to be acted on by one roll must, owing to feed, have left the other roll at a point where the pass between the rolls is wider. The effect of this is apparent even on the real billet, where it makes the free part of the billet-periphery spiral, as indicated roughly in Fig. 11. The difference between this spiral periphery and the periphery of the original ideal circular billet increases with the rate of feed and the rate of taper of the pass and is in the same direction and requires the same kind of correction, as the increase in periphery due to actual flattening and being hardly distinguishable from the lengthening of periphery due to actual flattening need not be separately considered, but may, as I have done, be corrected under the general head of flattening. My practical roll from all that precedes is therefore seen to be a roll substantially hyperboloidal in shape and set in such relation to the axis of the real billet that its rotative effect on the coaxial ideal billet would be greater for the smaller roll-circles than for the larger ones.

All inventors that have preceded me have gone on the theory that rolling effect is dependent on nothing else but the size of the roll-circles. I am, I believe, the very first to call attention to the importance of position with relation to the common perpendicular of the axes and to show that the smaller roll-circles may have greater rolling effect than the larger ones and that they may have this greater rolling effect not only on the ideal billet, but also on the practical billet.

In the above discussion I have not paid any attention to feed, because increasing the smaller radii of the rolls to increase the rotary effect increases the feed in exactly the same proportion, which is as it ought to be.

It is obvious that a complete reducing and expanding roll constructed according to my correct principles of straight rolling is non-twisting in all its parts and that any segment or zone thereof however short and wherever selected may be used separately as a non-twisting roll either to reduce or to expand, provided it be so set with respect to the billet-axis as to occupy exactly the same position that it would occupy as a part of the complete roll. When a zone to be so selected lies entirely on one side of the point of closest approach of the axes, the limitation referred to in connection with Figs. 1, 2, and 3 does not exist, and the generating-line G$x$ of the hyperboloid in which said zone is to be selected may make any angle G$xa$, Fig. 7, less than ninety degrees with the roll-axis, and the zone so selected may be placed as close to the billet-axis in plan, Fig. 8, or angularly in elevation, Fig. 7, as may be desired, provided only the necessary connection or mutual dependence of relations in the plan and in the elevation be retained. The angle F$xa$ has the same limit of ninety degrees.

The guides, mountings, and driving mechanism of my rolls form no part of the present invention and may be of any well-known or desired form, and the mandrel, which I have lettered D, is of any preferred form or construction.

When my rolls extend equally far either way from the common perpendicular, the action of the rolls without any change in rotation will be either expanding or reducing, according to the size of the blank and the size of the mandrel. This establishes that there is in my rolls no real difference in kind between rolling to expand and rolling to reduce. In fact, in any kind of rolling, however great the reduction may be, there is always necessarily present a certain amount of expansion, which takes place over the mandrel and which in so-called "pure" reducing-rolls must take place unsupported and unaided by rolling action unless the metal be wholly opened up in the narrowest part of the pass, an operation which is decidedly impractical in low-twist rolling. Of course when the rolls do not extend equally far from the common perpendicular it becomes necessary to take into consideration the direction in which the metal passes through the rolls, and hence to see that they revolve as they should to force the metal over the mandrel according as the mandrel is placed between the shorter zones or between the longer ones.

With the correct principles of straight rolling fully understood it is possible to explain the exact relation that my rolls bear to the hemispheroidal rolls of Mannesmann. If Mannesmann's rolls in the proportions of his Figs. 5 and 6 were to be provided with my concave non-twisting extension, it would be seen, first, that such concave extension could not without interfering with other zones be carried much beyond the common perpendicular or point where the roll-axes appear to cross in his Fig. 5, and, secondly, that because of the small space between the axes at the common perpendicular (see his Fig. 6) the smallest roll-circle would be very small and the smallest billet-circle very much smaller or practically *nil*. All that part of the modified rolls which would lie in the vicinity of the common perpendicular could not be used, and hence it may be asserted that the expanding and so-called "non-twisting" zones of the rolls shown in Mannesmann's Figs. 5 and 6 cannot practically be extended so as to also reduce without twist. There is, however, nothing to prevent the use of the non-twisting concave extension of such rolls when it is made on a scale so large that the smallest roll and billet circles shall come within the possible proportions of practice, and then the only limitations are those found in interfering zones and in the rate of feed.

The question of interfering zones never can arise except in regard to zone E′ and never does arise in any case until the angle G$xa$, Fig. 7, exceeds forty-five degrees, and the roll-circles go on increasing at a rate more rapid than the rate of increase of the space between the expanding part of one roll-axis and the reducing part of the other roll-axis.

Figure 12:
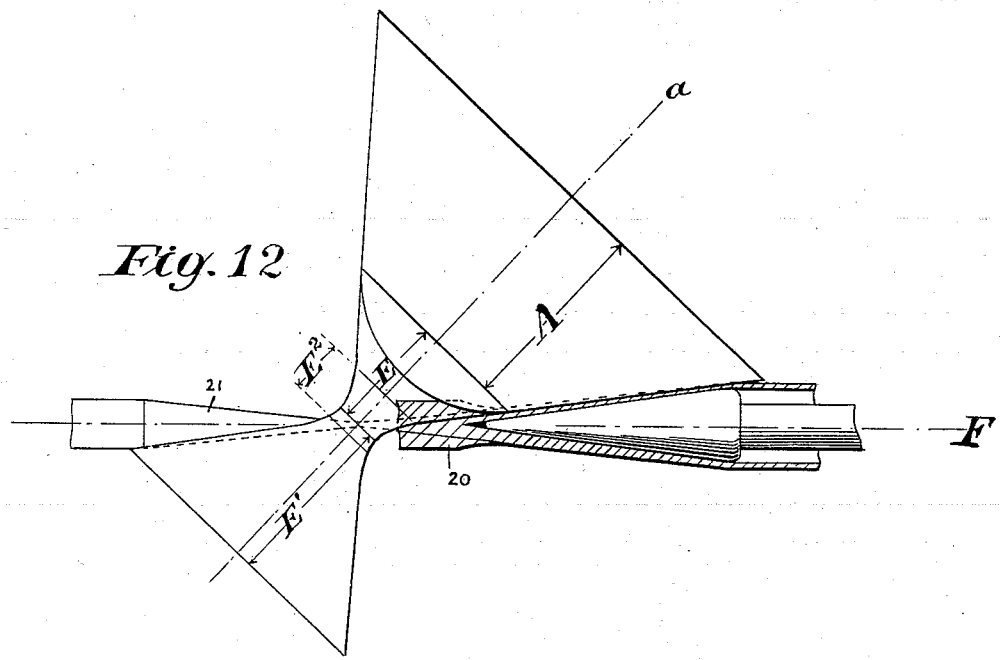
Figure 13:
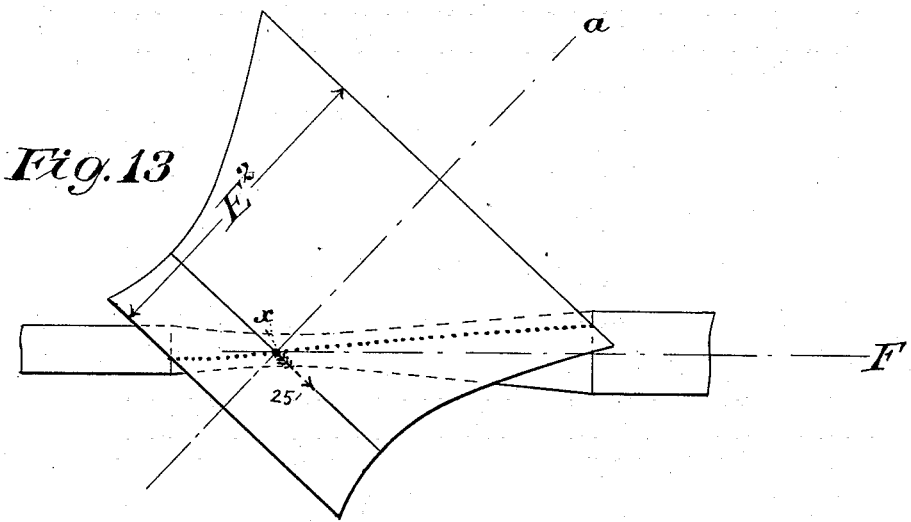
Figure 14:
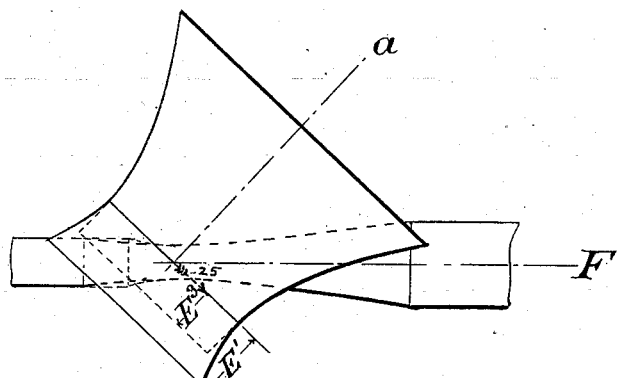
Figure 15:
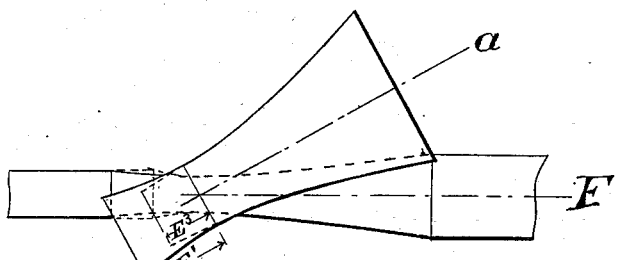

The difference between my rolls and those of Mannesmann is made clear in the diagram Figs. 12, 13, 14, and 15. In Fig. 12 I show a hemispheroidal roll whose reducing zone is of course twisting, but whose expanding zone I have proportioned according to my correct principles, so it shall be exactly non-twisting, and in the same figure I have shown how the non-twist zone A may be extended through and beyond the crossing-point of the axes as non-twisting concave extensions E and E′. In the same figure also appear the billet 20 of the hemispheroidal roll and the billet 21 of the non-twist roll. In Figs. 13, 14, and 15 I show three forms of my rolls for rolling without twist substantially the same billet as billet 20. When the Mannesmann roll of Fig. 12 is provided with my extension E E′, it is seen in said figure that the smallest roll-circle becomes almost too weak to stand the strain. This would not be a vital objection because the zone E′ might be provided with an extra shaft and bearing, but what is impractical here is the great reduction in the billet 21. To overcome this difficulty, all that need be done is to make the rolls, as suggested above, on a scale so large that the smallest billet-circle shall be of the usual size, as shown in Fig. 13, where the roll $E^2$ is simply on a larger scale the central part $E^2$ of the modified roll of Fig. 12.

A very notable difference between Mannesmann's roll and mine is in the position of the line of contact of roll and billet. Mannesmann's line of contact is almost coincident with the line representing the profile of the billet and lies almost entirely in an axial plane, while my line of contact (shown dotted in Fig. 13) is in skewed relation to the billet-axis and gradually winds around the billet to meet the common perpendicular CP at right angles and cross over onto the opposite side of the billet. This twist in the line of contact is necessarily present in any roll and billet whose axes cross without meeting and is not noticeable in the hemispheroidal roll simply because its zones are at a relatively-great distance from the point of closest approach of the axes—that is, great as compared with the shortest possible distance between the axes. A glance at Figs. 12 and 13 shows that my line of contact is simply a continuation of Mannesmann's expanding contact-line as corrected by me.

Another difference between Mannesmann's device and mine is found in the shape of the pass. Mannesmann's reducing-pass is necessarily limited in extent and his rate of reduction is necessarily greater than his rate of expansion. My pass has no such limitations. Its reducing part in most cases may be made as long as the expanding part and even longer, if desired, and may have a rate of reduction equal to, greater, or less than the rate of expansion. When exact equal rolling is desired, however, my pass is necessarily symmetric with respect to the common perpendicular CP of the axes, except that the expanding zones may require less correction for flattening of the billet.

My rolls may vary considerably in shape, size, and relation and may be adapted to roll a small billet under very different conditions. Thus in my Figs. 13, 14, and 15 I show three different forms of non-twist rolls acting on billets that have the same diameter of greatest reduction, same diameter of blank, and same diameter of finished tube and all respectively equal to the corresponding diameters of the Mannesmann's billet 20 of Fig. 12. Fig. 14 shows a modification of the roll of Fig. 13 to make the rate of expansion the same as in the original billet 20. An arrow 25 in Figs. 13 and 14 shows the direction in which the contacting-point of the smallest roll-circle drives the smallest section of the billet and gives a very clear idea of the amount of draw and of the rate of feed—that is, the relation between feed and rotation. As it might be undesirable in certain cases to give the billet a feed as rapid as that shown in Figs. 13 and 14, I have added a Fig. 15, in which the rate of feed is much reduced by reducing the angular relation of the axes. The billet in this last figure is identical with that of Fig. 14, and therefore also with that of Figs. 12 and 13. If it be desired to make a billet exactly similar to billet 20 of Fig. 12, all that need be done in Figs. 14 and 15 is to reduce the diameters of the zone E', converting it into an approximately cylindrical extension $E^3$, and what is thus taken from the roll is of course added to the billet, as shown by the dotted lines. Any departure of this kind from the true shape of a non-twist roll introduces twist which may be what I shall call either "fore" twist or "back" twist, according to the relation of the twist to the direction of rotation of the blank. Fore twist is had when the exit end of the billet revolves faster than the entrance end and back twist when the exit end revolves slower than the entrance end. In defining these terms I have found it convenient to refer to rolls which are as a whole either fore twisting or back twisting; but it is clear that any roll may be considered as a series of elementary rolls or zones, some of which may be fore twisting and others non-twisting or even back twisting. The hemispheroidal roll of Fig. 12, for example, is fore twisting in the spheroidal reducing part and non-twisting in the expanding part. A certain amount of either back twist or fore twist may be desirable in special cases, and when a certain or small degree of either back twist or fore twist is required the correct principles of straight rolling, as above set forth by me, are indispensable as a basis of operations, because when the true non-twist roll is known it is easy to increase or to decrease any of its circles and to correspondingly decrease or increase the billet-circles without changing the relation of the axes, so as to introduce any amount and direction of twist desired. In doing this the obliquity of action of the roll-circles on the billet-circles, as illustrated in my Fig. 6, is not appreciably changed, and hence the modification of a non-twist roll to a roll having a determined amount of fore or back twist is a mere arithmetical operation. The non-twist roll, however, that is used as a basis of operations must be exactly non-twisting or differ very little from the exact non-twisting roll and should not, like the roll determined by any of the approximate rules as the proportional-circle rule or the equivalent one of Mannesmann probably, be a greater departure from the exact non-twisting roll than is the roll sought.

A proper selection of a zone or zones from the various forms of rolls I have shown and a proper decrease or increase of the scale thereof, as was illustrated in the case of the zone $E^2$, Figs. 12 and 13, will give a mill meeting all the conditions of actual practice of this branch of the art.

Whenever I have spoken of rolls as being impractical, it is important to note that any roll is necessarily a certain limited zone of the complete indefinitely-long hyperboloid in which it is taken and that any attributes predicated of such a roll do not necessarily apply to any other zones outside of it nor even to zones within it of less extent than itself. Thus a roll—as the roll of Fig. 13, for instance—which might in certain cases be objectionable on account of excessive feed, is taken from a hyperboloid other zones of which are not only practical, but may offer the best possible solution of equal rolling for a special case. As an instance, the zone A of Fig. 12, which is simply on a smaller scale a continuation of the zones of Fig. 13, is a very useful form of roll either to expand or to reduce when it is constructed according to my correct principles of non-twist rolling.

In designing non-twist rolls with data that do not permit of estimating the exact degree of flattening I prefer to make the rolls so they shall err in the direction of fore twist rather than in the direction of back twist.

The principles of relation and proportion which I have hereinbefore set forth hold good when the rolls are rotated in the direction opposite to that shown in the drawings for the purpose of reducing and piercing billets with little or no subsequent expansion, and for this reason I have not limited any of my claims by specifying the direction of rotation of the rolls or the location or construction of the mandrel, which may be merely a piercing-mandrel.

A hyperboloid roll is fully determined when the relation of its generating-line to its axis is given by an elevation $Gx$, Fig. 7, and a plan $G^4 z^4$, Fig. 8, and when these have been selected for any particular case the profile of the roll may be plotted by finding its radii for different points of the axis, any radius, as QK, being the hypotenuse $Gz^4$ of a right-angle triangle having GQ as one side and $Qz^5$, equal to the constant $Cz^4$ of Fig. 8, as the other side.

What I claim, and desire to secure by Letters Patent, is—

1. In a machine for reducing and expanding blanks to form tubes or tubular blanks, and in combination with the expanding-mandrel thereof, coöperating rolls proportioned and arranged to extend through and on both sides of the point of nearest approach of their axes the zones on each side of said points converging toward and curving into each other, said rolls being set to form a continuous pass the boundaries of which similarly converge toward and curve into each other, for the purpose described.

2. In a machine for rolling blanks to form tubes or tubular blanks, and in combination with the mandrel thereof, coöperating diagonally-acting rolls proportioned and arranged to extend through and on both sides of the point of nearest approach of their axes, flaring symmetrically from said point and forming a continuous pass similarly flaring in either direction, for the purpose described.

3. In a tube-rolling machine coöperating diagonally-acting rolls proportioned and arranged to taper in the same direction, as the pass between them the smaller circles of the roll being in the direction of the taper progressively larger in proportion to the corresponding circles of the pass, substantially as described.

4. In a tube-rolling machine coöperating diagonally-acting approximately-hyperboloidal rolls proportioned and arranged to taper in the same direction, as the pass between them the smaller circles of the roll being in the direction of the taper progressively larger in proportion to the corresponding circles of the pass substantially as described.

5. In a tube-rolling machine coöperating diagonally-acting concave-faced rolls, proportioned and arranged to taper in the same direction as the pass between them and to generate a longitudinally-concave surface in the billet the smaller circles of the roll, being in the direction of the taper, progressively larger in proportion to the corresponding circles of the pass, substantially as described.

6. In a tube-rolling machine and in combination with the mandrel thereof, coöperating diagonally-acting rolls having approximately the form of the central zone of a hyperboloid tapering toward the points of nearest approach of their axes to form a pass tapering in the same direction, the smaller circles of the roll being, in the direction of their taper progressively larger in proportion to corresponding smaller circles of the pass, substantially as described.

7. In a tube-rolling machine and in combination with the mandrel thereof, coöperating diagonally-acting rolls enlarged toward the point of nearest approach of their axes sufficiently to compensate for the decreased rotative effect due to the difference of efficiency in the angle at which they engage the billet, substantially as described.

8. In a tube-rolling machine and in combination with the mandrel thereof, coöperating diagonally-acting rolls proportioned and arranged to taper in the same direction as the pass between them, the circles of the roll as they become smaller in the direction of the taper, being progressively larger in their proportion to the corresponding circles of the pass said increase in the proportional size of the smaller circles of the roll being sufficient to compensate for the decreased rotative effect due to the difference in efficiency of the angle at which they engage the billet substantially as described.

9. In a tube-rolling machine coöperating diagonally-acting rolls proportioned and arranged to taper in the same direction as the pass between them, the smaller circles of the roll being in the direction of the taper progressively larger in proportion to the corresponding circles of the pass, said increase of the proportional size of the smaller circles of the roll, being sufficient to compensate for the decreased rotative effect due to the difference in efficiency of the angle at which they engage the billet, substantially as described.

10. In a tube-rolling machine coöperating diagonally-acting approximately-hyperboloid rolls proportioned and arranged to taper in the same direction as the pass between them, the smaller circles of the roll being in the direction of the taper progressively larger in the proportion to the corresponding circles of the pass, said increase of the proportional size of the smaller circles of the rolls, being sufficient to compensate for the decreased rotative effect due to the difference in efficiency of the angle at which they engage the billet, substantially as described.

11. In a tube-rolling machine coöperating diagonally-acting concaved face-rolls proportioned and arranged to taper in the same direction as the pass between them and the smaller circles of the roll being in the direction of the taper progressively larger in proportion to the corresponding circles of the pass, said increase of the proportional size of the smaller circle of the roll being sufficient to compensate for the decreased rotative effect due to the difference in efficiency of the angle at which they engage the billet, substantially as described.

12. In a tube-rolling machine and in combination with the mandrel thereof, coöperating diagonally-acting rolls having approximately the form of the central zone of a hyperboloid tapering toward the points of nearest approach of their axes to form a pass tapering in the same direction, the smaller circles of the roll being in the direction of their taper, progressively larger in proportion to the smaller circles of the pass, said increase in the proportional size of the smaller circles of the roll, being sufficient to compensate for the decreased rotative effect due to the difference in efficiency of the angle at which they engage the billet, substantially as described.

13. In a tube-rolling machine and in combination with the mandrel thereof, coöperating diagonally-acting rolls set as explained, so their rotative effect on the body of revolution generated between them is greater for their smaller circles than for their larger ones, for the purpose described.

14. In a tube-rolling machine and in combination with the mandrel thereof, equal hyperboloid zones set as explained so their rotative effect is greater for the smaller roll-circles than for the larger ones.

15. In a tube-rolling machine and in combination with the mandrel thereof, coöperating diagonally-acting rolls, approximately hyperboloidal in shape and set as explained so their rotative effect on the body of revolution generated between them is greater for the smaller circles than for the larger ones, for the purpose described.

16. In a tube-rolling machine and in combination with the mandrel thereof, coöperating diagonally-acting rolls having approximately the form of a central zone of a hyperboloid and set so their rotative effect on the body of revolution generated between them is greater for the smaller circles than for the larger ones, in order that their rotative effect on a real billet shall be the same for all sections of the billet.

17. In a tube-rolling machine and in combination with the mandrel thereof, coöperating diagonally-acting rolls enlarged toward the point of nearest approach of their axes sufficiently to compensate for the decreased rotative effect due to the difference of efficiency in the angle at which they engage the billet, and for the flattening of the billet, substantially as described.

18. A roll with a profile corresponding to the central zone of a hyperboloid but swelled at the narrowest part to a slightly-greater diameter, for the purpose described.

19. In a machine for rolling solid or pierced blanks to form tubes or tubular blanks and in combination with the mandrel thereof, continuous similar longitudinally-concave rolls formed with their smallest diameters intermediate their ends and arranged with said smallest diameters substantially opposite each other at the points of closest approach of the roll-axes and set to form a pass the transverse dimensions of which are substantially proportional to the corresponding transverse dimensions of the roll for the purpose set forth.

JOSEPH BECKER.

Witnesses:
CAMILLE BECKER,
S. A. SWEARINGEN.

It is hereby certified that in Letters Patent No. 651,790, granted June 12, 1900, upon the application of Joseph Becker, of Washington, District of Columbia, for an improvement in "Machines for Rolling Solid or Pierced Blanks for Forming Tubes or Tubular Blanks," an error appears in the printed specification requiring correction, as follows: In line 24, page 7, the word "small" should read *same;* and that the said Letters Patent should be read with this correction therein that the same may conform to the record of the case in the Patent Office.

Signed, countersigned, and sealed this 19th day of June, A. D., 1900.

[SEAL.] F. L. CAMPBELL,
*Assistant Secretary of the Interior.*

Countersigned:
    WALTER H. CHAMBERLIN,
        *Acting Commissioner of Patents.*